US012779939B2

(12) United States Patent
Nishiyama et al.

(10) Patent No.: US 12,779,939 B2
(45) Date of Patent: Nov. 3, 2026

(54) TEMPERATURE CONTROL SYSTEM

(71) Applicant: TOYOTA JIDOSHA KABUSHIKI KAISHA, Aichi-ken (JP)

(72) Inventors: Masahiro Nishiyama, Toyota (JP); Kenji Tsukagishi, Toyota (JP); Hiromichi Senba, Toyota (JP); Toshiki Nakanishi, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 82 days.

(21) Appl. No.: 19/033,480

(22) Filed: Jan. 22, 2025

(65) Prior Publication Data

US 2025/0242657 A1 Jul. 31, 2025

(30) Foreign Application Priority Data

Jan. 30, 2024 (JP) ................................ 2024-011616

(51) Int. Cl.
*B60H 1/00* (2006.01)

(52) U.S. Cl.
CPC ..... *B60H 1/00735* (2013.01); *B60H 1/00278* (2013.01); *B60H 1/00878* (2013.01); *B60H 2001/00307* (2013.01)

(58) Field of Classification Search
CPC ............ B60H 1/00278; B60H 1/00735; B60H 1/00878; B60H 2001/00307
See application file for complete search history.

(56) References Cited

U.S. PATENT DOCUMENTS 9,008,858 B1 * 4/2015 Payne ................ B60G 17/0195 701/1
11,260,719 B2 * 3/2022 Tomita ............... B60H 1/00342
2020/0215871 A1 7/2020 Tomita et al.

FOREIGN PATENT DOCUMENTS

JP 2004-324613 A 11/2004
JP 2020-111084 A 7/2020
JP 2021-027797 A 2/2021

* cited by examiner

*Primary Examiner* — Jonathan Bradford
(74) *Attorney, Agent, or Firm* — HAUPTMAN HAM, LLP

(57) ABSTRACT

The temperature control system mounted on a vehicle, the temperature control system comprises a temperature control device configured to cool and control temperatures of a plurality of target in-vehicle devices that generate heat as a vehicle travels; and a temperature controller that controls driving of the temperature control device, wherein the temperature controller is configured to, when a special mode, which is a mode for performing special traveling, is set, estimate a start time of the special traveling and a time required for temperature control of the plurality of target in-vehicle devices, cause the temperature control device to start temperature control at a timing obtained by back-calculating the time required for temperature control from the estimated start time of the special traveling.

5 Claims, 6 Drawing Sheets

| | Lv. 1 | Lv. 2 | Lv. 3 | Lv. 4 | Lv. 5 | Lv. 6 |
|---|---|---|---|---|---|---|
| AIR VOLUME | – | 5% Down | 10% Down | 15% Down | 20% Down | 25% Down |
| TARGET TEMPERATURE OF EVAPORATOR | – | – | + 1°C | + 2°C | + 3°C | + 4°C |

GOOD ← COMFORTABILITY → BAD

LOW ← TEMPERATURE CONTROL CAPABILITY → HIGH

FIG. 6

TEMPERATURE CONTROL SYSTEM

CROSS REFERENCE TO RELATED APPLICATION

This application claims priority to Japanese Patent Application No. 2024-011616 filed on Jan. 30, 2024, which is incorporated herein by reference in its entirety including the specification, claims, drawings, and abstract.

TECHNICAL FIELD

This specification discloses a temperature control system mounted on a vehicle and configured to control the temperature of one or more target in-vehicle devices.

BACKGROUND

There is a target in-vehicle device that generates heat as the vehicle travels. For example, in the case of an electric-driven vehicle, a traveling motor, a battery that supplies electric power to the traveling motor, and a power control unit (hereinafter referred to as a "PCU") that controls the output of electric power generate heat as the vehicle travels. If the temperature of the target in-vehicle device becomes excessively high, the vehicle cannot travel properly. Therefore, a temperature control system for controlling the temperature of these target in-vehicle devices has been proposed.

For example, Patent Document 1 discloses a cooling system for cooling a battery of a vehicle. In Patent Document 1, the flow path form of the refrigeration cycle circuit is switched to actively cool the target in-vehicle device at the timing when the sports traveling mode assuming high-speed traveling on the circuit is selected.

In many cases, there is a certain amount of waiting time after the user selects the sports traveling mode and before the user actually starts high-speed traveling. If the temperature control of the target vehicle-mounted device is started at the timing when the sports traveling mode is selected even though the waiting time is long, there is a concern that power consumption may increase.

Therefore, the present specification discloses a temperature control system that more efficiently controls the temperature of a target in-vehicle device in a case where a special mode in which driving performance is prioritized over fuel consumption is selected.

CITATION LIST

PATENT DOCUMENT 1: JP.2020-111084.A

SUMMARY

An temperature control system mounted on a vehicle, the temperature control system comprises a temperature control device configured to cool and control temperatures of a plurality of target in-vehicle devices that generate heat as a vehicle travels; and a temperature controller that controls driving of the temperature control device, wherein the temperature controller is configured to, when a special mode, which is a mode for performing special traveling, is set, estimate a start time of the special traveling and a time required for temperature control of the plurality of target in-vehicle devices, cause the temperature control device to start temperature control at a timing obtained by back-calculating the time required for temperature control from the estimated start time of the special traveling.

With this configuration, since the temperature control is started at a necessary and sufficient timing, it is possible to suppress the power consumption required for the temperature control of the target in-vehicle device.

In this case, the temperature control device may control the temperatures of a plurality of target in-vehicle devices, and the temperature controller may be configured to: estimate the time required for temperature control for each of the plurality of target in-vehicle devices as an individual temperature control time; identify a maximum time among a plurality of estimated individual temperature control times as a required temperature control time; and cause the temperature control device to start the temperature control at a timing obtained by back-calculating the necessary temperature control time from the start time of the special traveling.

With this configuration, the temperature control is started at a more appropriate timing.

Further, the vehicle may be an electricity-driven vehicle including a battery and a traveling motor driven by electric power supplied from the battery, and the temperature controller may be configured to: estimate an SOC required for the special traveling as a required SOC; and stop the temperature control when a current SOC of the battery is less than the required SOC.

With such a configuration, electric power necessary for the special traveling can be reliably secured, and thus traveling desired by the user can be performed.

Further, the temperature controller may be configured to correct a control of a vehicle interior air conditioning according to a comparison result between a current temperature and a target temperature of each of the plurality of target in-vehicle devices.

With this configuration, the temperature control and the air conditioning of the target in-vehicle device are performed in a balanced manner.

Further, the vehicle may be an electricity-driven vehicle including a battery and a traveling motor driven by electric power supplied from the battery, the plurality of target in-vehicle devices may include the battery, the traveling motor, and a PCU, the temperature control device may include a radiator fan, a compressor, and a water pump, the special traveling may be a course traveling in which the vehicle travels on a course of a circuit, the start time of the special traveling may be a start time of the course traveling, the temperature controller may be configured to estimate the start time of the course traveling based on an instruction from a user or information obtained by communication with an external communication device.

According to the temperature control system disclosed in this specification, when the special mode is selected, the temperature of the target in-vehicle device can be controlled more efficiently.

BRIEF DESCRIPTION OF DRAWINGS

Embodiment(s) of the present disclosure will be described based on the following figures, wherein:

FIG. 6 is a diagram showing a map indicating a correction amount of an air conditioning parameter.

DESCRIPTION OF EMBODIMENT

Figure 1:
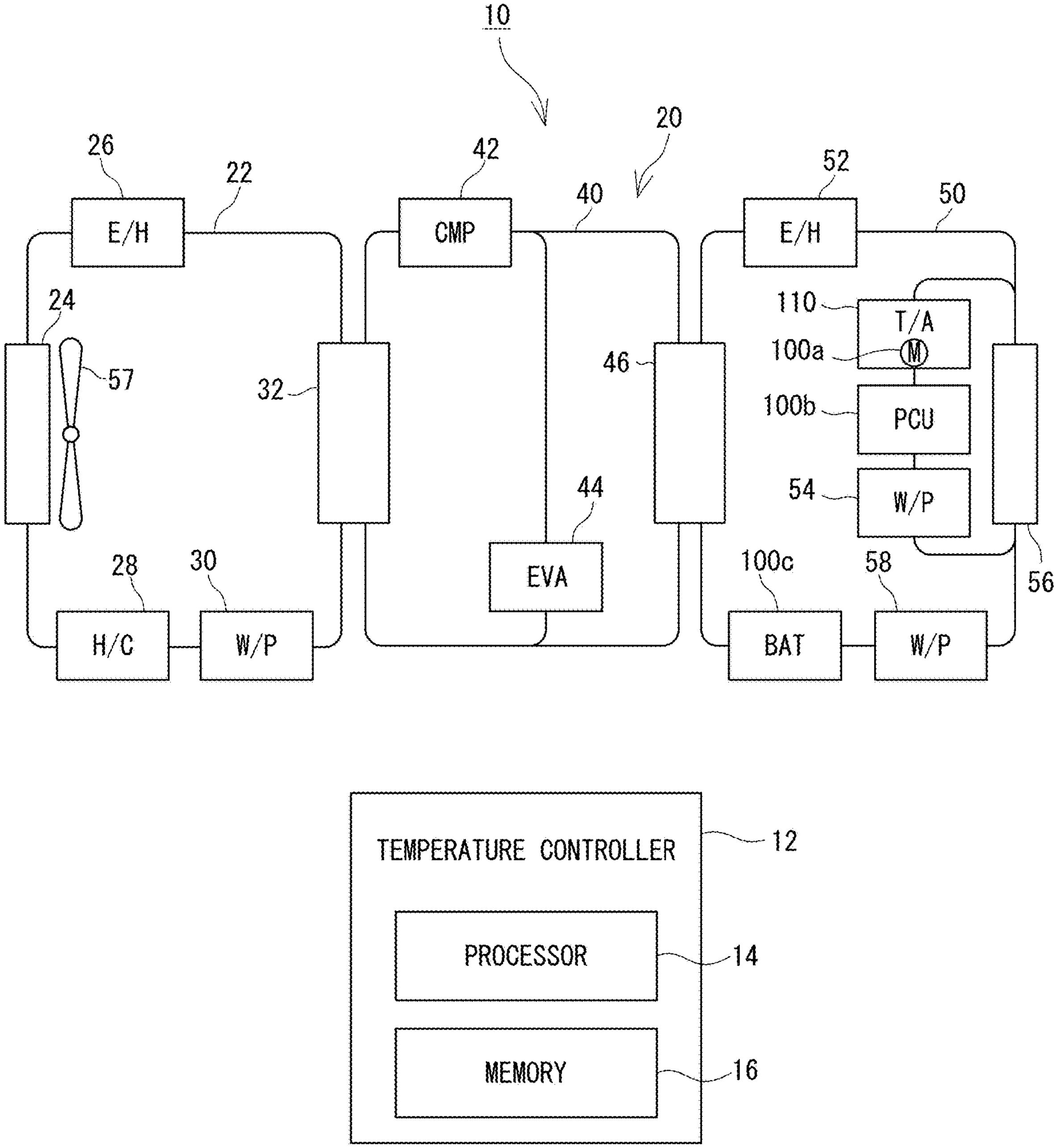
FIG. 1 is a block diagram showing a configuration of a temperature control system.

Hereinafter, a configuration of the temperature control system 10 will be described with reference to the drawings. FIG. 1 is a block diagram showing a configuration of a temperature control system 10. The temperature control system 10 is mounted on a vehicle and controls the temperature of some in-vehicle devices (hereinafter referred to as "target in-vehicle devices 100"). The type of the vehicle on which the temperature control system 10 is mounted is not particularly limited. Therefore, the vehicle on which the temperature control system 10 is mounted may be any of a battery electric vehicle, a hybrid electric vehicle, a fuel cell electric vehicle, and an engine vehicle. Hereinafter, a temperature control system 10 mounted on a battery electric vehicle will be described as an example.

The temperature control system 10 includes a temperature control device 20 and a temperature controller 12. The temperature control device 20 is a device that cools and controls the temperature of the target in-vehicle device 100. Here, the target in-vehicle device 100 is a device that contributes to traveling of the vehicle and generates heat as the vehicle travels. For example, a traveling motor 100*a*, a PCU 100*b*, and a battery 100*c* correspond to a target in-vehicle device. Hereinafter, when the traveling motor 100*a*, the PCU 100*b*, and the battery 100*c* are not distinguished from each other, they are collectively referred to as a "target in-vehicle device 100". The traveling motor 100*a* is a motor generator that outputs traveling power and generates electric power by braking force. The traveling motor 100*a* is unitized with a transmission (not shown), and constitutes a transaxle 110. The battery 100*c* is a rechargeable secondary battery. Electric power is supplied from the battery 100*c* to the traveling motor 100*a*, and the electric power generated by the traveling motor 100*a* is charged to the battery 100*c*. The PCU 100*b* includes an inverter that drives the traveling motor 100*a*, a DC-DC converter that performs voltage conversion, and the like. The PCU 100*b* controls electric power supplied to the traveling motor 100*a*.

The temperature control device 20 cools and controls the temperature of the target in-vehicle device 100 as necessary. The temperature control device 20 includes a high-temperature cooling circuit 22, a refrigerant circuit 40, and a low-temperature cooling circuit 50. The high-temperature cooling circuit 22 circulates cooling water as a heat medium. The high-temperature cooling circuit 22 includes a heater core 28, an electric heater 26, a radiator 24, a water pump 30, and a radiator fan 57. The water pump 30 pumps and circulates the cooling water. The electric heater 26 heats the cooling water. The heated cooling water exchanges heat with the surrounding air in the heater core 28. By blowing the heated air into the vehicle, the vehicle interior is heated.

The radiator 24 air-cools the cooling water output from the heater core 28. The radiator 24 is arranged side by side with a radiator 56 of a low-temperature cooling circuit 50, which will be described later, in an up-down direction or a front-rear direction. The radiator fan 57 is disposed behind the radiators 24 and 56, and sucks the outside air so that the outside air flows toward the radiators 24 and 56.

The refrigerant circuit 40 circulates the refrigerant while changing its state. The refrigerant circuit 40 includes a compressor 42, an evaporator 44, and a water-cooled condenser 32. The compressor 42 compresses the refrigerant. The compressed refrigerant condenses in the water-cooled condenser 32. The condensed refrigerant is injected from an expansion valve (not shown) toward the evaporator 44 and expanded. At this time, the refrigerant is vaporized to cool the air around the evaporator 44. The air around the evaporator 44 is blown toward the inside of the vehicle, so that the inside of the vehicle is cooled. The water-cooled condenser 32 discharges the heat of the cooling circuit to the cooling water of the high-temperature cooling circuit 22.

The low-temperature cooling circuit 50 circulates cooling water as a heat medium. The low-temperature cooling circuit 50 includes a chiller 46, an electric heater 52, a radiator 56, and water pumps 54 and 58. The low-temperature cooling circuit 50 controls the temperature of the target in-vehicle device 100, that is, the traveling motor 100*a*, the PCU 100*b*, and the battery 100*c*. The electric heater 52 heats the cooling water. The electric heater 52 is turned on when the target in-vehicle device 100 is heated. When the target in-vehicle device 100 is cooled, the cooling water absorbs heat of the target in-vehicle device 100. The heat of the cooling water is discharged to the outside air and the refrigerant circuit 40 via the radiator 56 and the chiller 46. The water pumps 54 and 58 pump and circulate the cooling water. Although not illustrated, the temperature control device 20 further includes a sensor that directly or indirectly detects the temperature of the target in-vehicle device 100, and the detected temperature of the target in-vehicle device 100 is transmitted to the temperature controller 12.

The temperature controller 12 controls driving of the temperature control device 20. The temperature controller 12 is physically a computer having a processor 14 and a memory 16. In FIG. 1, the temperature controller 12 is illustrated as a single computer. However, the temperature controller 12 may be configured by combining a plurality of computers physically separated from each other.

The temperature controller 12 controls driving of the temperature control device 20 based on the air conditioning request input by the user and the detected temperature of the target in-vehicle device 100. For example, the temperature controller 12 increases the outputs of the compressor 42, the water pumps 30, 54, and 58, and the radiator fan 57 as the detected temperature of the target in-vehicle device 100 increases and the necessary cooling amount increases. As a result, the target in-vehicle device 100 is cooled more quickly. In addition, the temperature controller 12 changes the control parameter of the temperature control device 20 so that the cooling capability of the target in-vehicle device 100 is improved when the special mode described later is enabled as compared with when the special mode is disabled.

Next, the special travel and the special mode will be described. The special traveling is a traveling mode in which the traveling performance is more important than the fuel efficiency, the comfort, and the like. For example, course traveling on a circuit corresponds to "special traveling". The special mode is a mode for performing the special travel. The vehicle on which the temperature control system 10 is mounted can select the special mode. The vehicle may transition to the special mode in response to a user instruction. As another form, the vehicle may automatically transition to the special mode based on the current position of the vehicle, a communication result with an external communication device, and the like. For example, when the current position of the vehicle is in a circuit venue registered in advance, the mode may automatically transition to the special mode. When the vehicle receives the race program from the external communication device owned by the circuit operator, the vehicle may automatically transition to the special mode based on the race program.

When the special traveling is performed, the load on the target in-vehicle device 100 increases, and the heat generation amount of the target in-vehicle device 100 increases. Therefore, when the special mode is effective, the temperature controller 12 changes the control parameter of the temperature control device 20 so that the cooling capability is improved.

This will be specifically described. Normally, the temperature controller 12 suppresses the outputs of the compressor 42, the water pumps 30, 54, and 58, and the radiator fan 57 (hereinafter, collectively referred to as "electric equipment for temperature control") to be equal to or less than a predetermined standard limit threshold value P1 in consideration of fuel consumption, quietness, and the like. Normally, when the detected temperature Td of the target in-vehicle device 100 is higher than the standard target temperature T1, the temperature controller 12 starts cooling the target in-vehicle device 100.

When the special mode is enabled, the temperature controller 12 changes the limit threshold value of the output of the electric equipment for temperature control to a special limit threshold value P2 higher than the standard limit threshold value P1. As a result, although the fuel consumption and the noise are deteriorated, the cooling capability of the temperature control device 20 is improved, so that the target in-vehicle device 100 can be rapidly cooled. As a result, it is possible to prevent the temperature of the target in-vehicle device 100 from reaching the limit temperature T_max even when the heat generation amount of the target in-vehicle device 100 increases due to high-speed traveling.

When the special mode is set, the temperature controller 12 specifies the start time of the special travel, and controls the driving of the temperature control device 20 so that the target in-vehicle device 100 becomes equal to or lower than the special target temperature T2 at the start time. The special target temperature T2 is sufficiently lower than the standard target temperature T1. Hereinafter, this control will be described in detail with reference to FIGS. 2 and 3.

Figure 2:
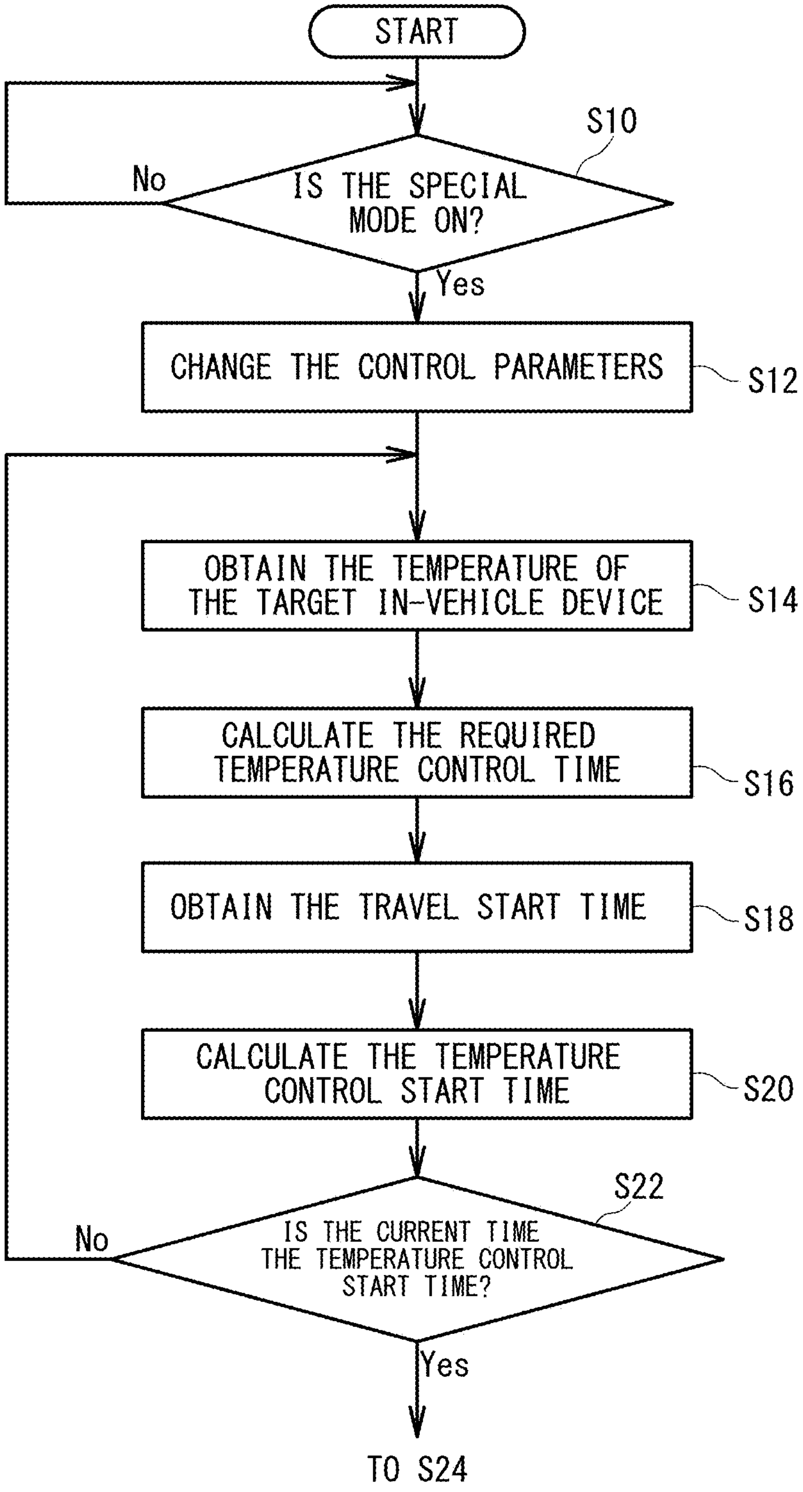
FIG. 2 is a flowchart showing the first half of the control process for the temperature control device when the special mode is set.

As shown in FIG. 2, when the special mode is set (Yes in S10), the temperature controller 12 changes the control parameter of the temperature control device 20 (S12). Specifically, the output limit threshold values of the compressor 42, the water pumps 54 and 58, and the radiator fan 57 are changed from the standard limit threshold value P1 to the special limit threshold value P2.

Subsequently, the temperature controller 12 determines whether or not it is necessary to control the temperature of the target in-vehicle device 100 by the temperature control device 20 (S14 to S20). Specifically, the temperature controller 12 first acquires the detected temperature Td of the target in-vehicle device 100 (S14). Here, in the case of the present example, the traveling motor 100*a*, the PCU 100*b*, and the battery 100*c* are the target in-vehicle device 100. In other words, in the case of the present example, there are a plurality of target in-vehicle devices 100. The temperature controller 12 acquires the detected temperature Td of each of the plurality of target in-vehicle devices 100.

Subsequently, the temperature controller 12 calculates a time required for temperature control of the plurality of target in-vehicle devices 100 as a required temperature control time (S16). In order to calculate the required temperature control time, the temperature controller 12 acquires the time required for temperature control of each of the plurality of target in-vehicle devices 100 as the individual temperature control time. The individual temperature control time is calculated based on at least the differential temperature between the detected temperature Td of the target in-vehicle device 100 and the special target temperature T2. Further, the individual temperature control time may be calculated in consideration of the outside air temperature, the air conditioning request from the user, and the like in addition to the above-described differential temperature. Note that the special target temperature T2 is an independent value for each of the plurality of target in-vehicle devices 100. For example, the special target temperature T2_*m* of the traveling motor 100*a* and the special target temperature T2_*v* of the battery 100*c* are different from each other. In any case, the temperature controller 12 calculates a plurality of individual temperature control times corresponding to each of the plurality of target in-vehicle devices 100. Then, the temperature controller 12 specifies the maximum time among the plurality of individual temperature control times as the required temperature control time.

Next, the temperature controller 12 acquires the time at which the special traveling is started (S18). The travel start time may be specified by the user, for example. Alternatively, the temperature controller 12 may estimate the travel start time. For example, when a race program is provided from the operator of the circuit, the temperature controller 12 may estimate the travel start time based on the obtained race program. Subsequently, the temperature controller 12 calculates, as the temperature control start time, a time obtained by back-calculating the travel start time by the required temperature control time (S20).

When the temperature control start time is calculated, the temperature controller 12 determines whether the current time has reached the temperature control start time (S22). When the temperature control start time has not been reached (No in S22), the temperature controller 12 returns to step S14 and recalculates the temperature control start time. That is, the required temperature control time varies depending on the state of the vehicle (e.g., charging, traveling, or stopping) and the outside air temperature. If the required temperature control time varies, the temperature control start time also varies. Therefore, the temperature controller 12 periodically repeats the recalculation of the temperature control start time until the temperature control start time is reached.

When the current time reaches the temperature control start time (Yes at S22), the temperature controller 12 determines that the temperature control process for the target in-vehicle device 100 is necessary, and starts the special temperature control (S24). That is, the temperature controller 12 cools the target in-vehicle device 100 by driving the electric equipment for temperature control (That is, the compressor 42, the water pumps 30, 54, and 58, and the radiator fan 57 are provided.) within a range in which the output of the electric equipment for temperature control does not exceed the special limit threshold value P2. Of course, the special limit threshold values P2 of the plurality of electric equipment for temperature control are different from each other. Therefore, for example, the special limit threshold value P2*c* of the compressor 42 is different from the special limit threshold value P2*f* of the radiator fan 57.

Thereafter, the temperature controller 12 monitors whether or not the temperature control is completed (S26). Specifically, when the detected temperature Td of the target in-vehicle device 100 is equal to or lower than the special target temperature T2, the temperature controller 12 determines that the temperature control is completed. When the temperature control is completed (Yes in S26), the temperature controller 12 temporarily stops the temperature control process (S28). After that, the temperature controller 12 appropriately executes the temperature control process according to the differential temperature between the detected temperature Td and the special target temperature T2, but the description thereof will be omitted.

Figure 4:
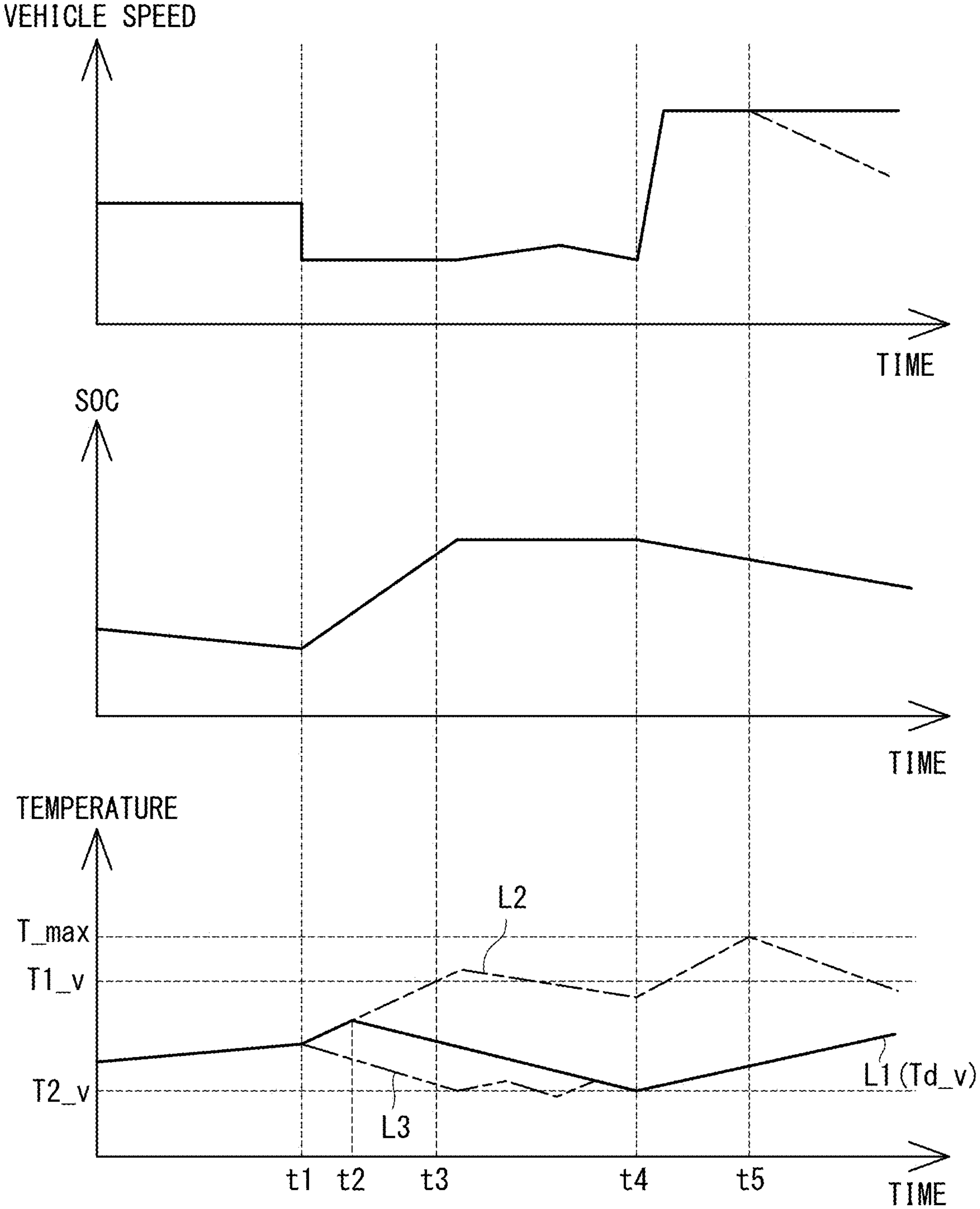
FIG. 4 is a diagram showing changes in the vehicle speed, the SOC of the battery, and the detected temperature of the battery when the special mode is set.

Next, a temperature change of the target in-vehicle device 100 due to such temperature control processing will be described by taking the battery 100*c* as an example. FIG. 4 is a diagram illustrating changes in the vehicle speed, the SOC of the battery 100*c*, and the detected temperature Td_v of the battery 100*c* when the special mode is set.

In the example of FIG. 4, the vehicle travels on a general road and arrives at the circuit at time t1. Then, at time t1, the special mode is set. When the special mode is set, the temperature controller 12 calculates the temperature control start time based on the comparison between the detected temperature Td_v of the battery 100*c* (the solid line L1 in the third row of FIG. 4) and the special target temperature T2_*v*. In the example of FIG. 4, since the detected temperature Td_v is not high at time t1, the temperature controller 12 does not start the special temperature control process.

On the other hand, the user charges the battery 100*c* of the vehicle in advance prior to course traveling (i.e., special traveling). As a result, after time t1, the SOC of the battery 100*c* rapidly increases. During this period, the temperature controller 12 repeatedly recalculates the temperature control start time. In the example in FIG. 4, the temperature control start time is reached at time t2. In this case, the temperature controller 12 drives the electric equipment for temperature control to cool the target in-vehicle device 100 such as the battery 100*c* within a range not exceeding the special limit threshold value P2 after the time t2. As a result, after time t2, the detected temperature Td_v of the battery 100*c* gradually decreases.

Here, as described above, the temperature controller 12 calculates the temperature control start time so that the detected temperature Td_v becomes equal to or less than the special target temperature T2_*v* at the start time of the special traveling. Therefore, in the example of FIG. 4, at t4, which is the travel start time, the detected temperature Td_v is the special target temperature T2_*v*.

The reason why the special temperature control is started in accordance with the travel start time when the special mode is selected in this manner will be described. A one-dot chain line L2 in the third row of FIG. 4 indicates the battery detected temperature Td_v when the special mode is not set. In this case, the temperature controller 12 starts the temperature control process (that is, the cooling process) at time t3 when the detected temperature Td_v exceeds the standard target temperature T1. In this case, since the cooling start time is later, the detected temperature Td_v of the battery 100*c* becomes higher at the traveling start time t4. When the special traveling is performed in this state, the detected temperature Td_v of the battery 100*c* exceeds the limit temperature T_max at time t5. In this case, the output of the battery 100*c* is limited, and the vehicle speed rapidly decreases. The one-dot chain line in the first row of FIG. 4 indicates the vehicle speed in this case. As a result, the special traveling desired by the user cannot be continued.

On the other hand, in the case of the technique of the present example, the battery 100*c* is sufficiently cooled at the travel start time. Therefore, after the time t4, even if the vehicle performs the special travel, the detected temperature Td_v does not reach the limit temperature T_max. As a result, according to the technique of the present example, it is possible to favorably perform special traveling desired by the user.

A two-dot chain line L3 in the third row of FIG. 4 indicates the battery detected temperature Td_v when the special temperature control is immediately started when the special mode is set. In this case, the temperature controller 12 starts cooling the target in-vehicle device 100 by driving the electric equipment for temperature control before time t2. Therefore, in this case, there is a problem that power is consumed more than necessary. On the other hand, in the case of the technique of the present example, since the cooling is started at the necessary and sufficient timing, the power consumption is suppressed as compared with the case of the line L3 of the two-dot chain line.

Incidentally, in the special traveling, since the traveling performance is more important than the fuel consumption, the power consumption is increased. The temperature controller 12 may change the control of the temperature control process according to the current SOC (hereinafter, referred to as "current SOC_dt") of the battery 100*c* in order to secure the electric power necessary for carrying out the special traveling. For example, the temperature controller 12 may calculate the SOC necessary for the special traveling (hereinafter referred to as "required SOC_rq"), and stop the special temperature control process when the current SOC_dt is less than the required SOC_rq.

Figure 3:
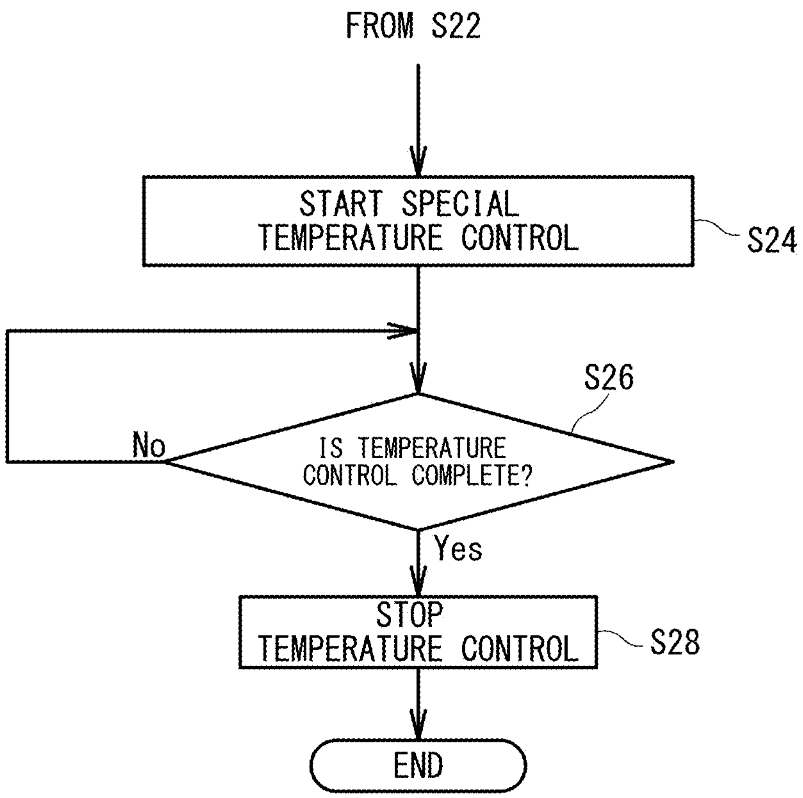
FIG. 3 is a flowchart showing the second half of the control process for the temperature control device when the special mode is set.
Figure 5:
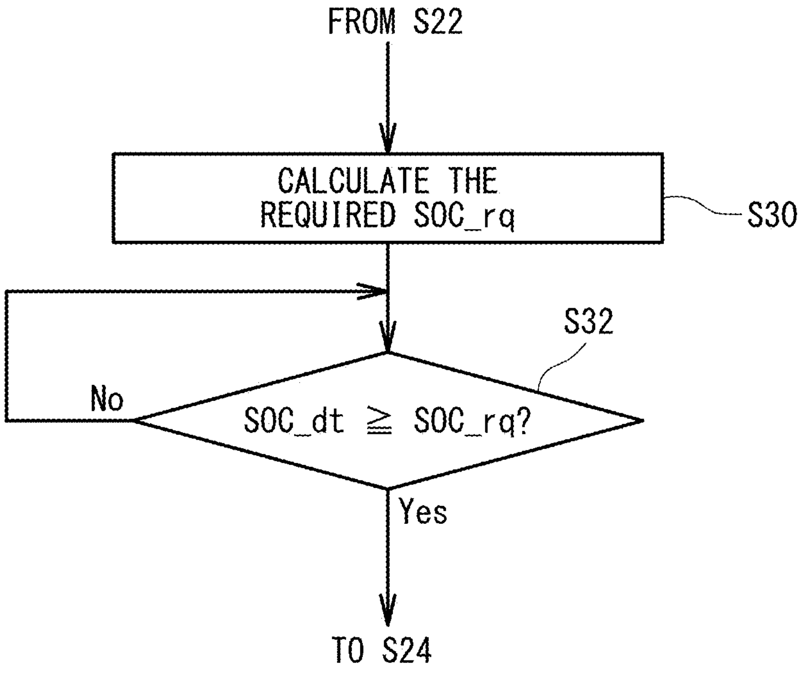
FIG. 5 is a flowchart showing additional processing.

That is, for example, the flow of FIG. 5 may be added between step S22 and step S24 of FIGS. 2 and 3. In this case, the temperature controller 12 calculates the required SOC_rq at the timing of the temperature control start time (S30), and compares the required SOC_rq with the current SOC_dt (S32). As a result of the comparison, when SOC_dt≥SOC_rq (Yes in S32), the temperature controller 12 proceeds to step S24 and starts the special temperature control process. On the other hand, when SOC_dt<SOC_rq (No in S32), the temperature controller 12 waits without starting the special temperature control process. During this waiting time, the temperature controller 12 may notify the user that the SOC is insufficient and prompt the user to charge the battery 100*c*. Further, in the above description, the flow of FIG. 5 is executed when the current time reaches the temperature control start time, but the flow of FIG. 5 may be executed at an earlier stage, for example, after step S12 or after step S18.

In addition, the temperature controller 12 may correct the control of the vehicle interior air conditioning according to the comparison result between the detected temperature Td of the target in-vehicle device 100 and the special target temperature T2. That is, when the differential temperature between the detected temperature Td and the special target temperature T2 is large, the amount of power required for temperature control also increases. Therefore, in order to secure the electric power necessary for the temperature control and the special traveling, the temperature controller 12 may change the air-conditioning parameters so that the air-conditioning capability decreases as the differential temperature increases.

For example, the temperature controller 12 may correct the air conditioning parameters based on a map as shown in FIG. 6. FIG. 6 is a map showing a correction amount of an air conditioning parameter during a cooling operation. In FIG. 6, the first row is a level determined by the differential temperature between the detected temperature Td and the special target temperature T2. As the differential temperature increases, the numerical value of the level also increases. The second line is a correction value of the air volume from the evaporator 44 to the vehicle cabin. The third line is a correction value of the target temperature of the evaporator 44.

As shown in FIG. 6, as the differential temperature increases and the level increases, the air volume of the air conditioning decreases and the target temperature of the evaporator 44 increases. As a result, the greater the differential temperature, the less comfortable the passenger compartment. On the other hand, since the amount of power available for temperature control of the target in-vehicle device 100 increases, the temperature control capability of the temperature control device 20 can be improved as the differential temperature increases. As a result, it is possible to keep the target in-vehicle device 100 at an appropriate temperature at the start of the special travel, and it is possible to perform the good special travel. The map illustrated in FIG. 6 is an example, and may be appropriately changed. For example, although both the air volume and the target temperature of the evaporator 44 are corrected in FIG. 6, only one of them may be corrected. The temperature control parameter may not be corrected at all as long as sufficient power can be secured.

Further, all of the configurations described above are examples, and other configurations may be appropriately changed as long as the configuration of claim 1 is provided. For example, in the above description, the temperature control system 10 mounted on the battery electric vehicle has been described as an example. However, the technology disclosed in the present specification may be mounted on other types of vehicles without being limited to battery electric vehicles. Therefore, the temperature control system 10 may be mounted on an engine vehicle, a hybrid electric vehicle, or the like. In this case, the temperature control device 20 includes a cooling circuit for cooling the engine, and the temperature control electric device includes a water pump for circulating the engine cooling water.

REFERENCE SIGNS LIST

10 temperature control system, 12 temperature controller, 14 processor, 16 memory, 20 temperature control device, 22 high-temperature cooling circuit, 24 radiator, 26 electric heater, 28 heater core, 30 water pump, 32 water-cooled condenser, 40 refrigerant circuit, 42 compressor, 44 evaporator, 46 chiller, 50 low-temperature cooling circuit, 52 electric heater, 54 water pumps, 56 radiator, 57 radiator fan, 100 target in-vehicle device, 100*a* traveling motor, 100*b* PCU, 100*c* battery, 110 transaxle.

The invention claimed is:

1. A temperature control system mounted on a vehicle, the temperature control system comprising:

a temperature control device configured to cool and control temperatures of a plurality of target in-vehicle devices that generate heat as a vehicle travels; and a temperature controller that controls driving of the temperature control device, wherein the temperature controller is configured to, when a special mode, which is a mode for performing special traveling, is set, estimate a start time of the special traveling and a time required for temperature control of the plurality of target in-vehicle devices, cause the temperature control device to start temperature control at a timing obtained by back-calculating the time required for temperature control from the estimated start time of the special traveling.

2. The temperature control system according to claim 1, wherein the temperature control device controls the temperatures of a plurality of target in-vehicle devices, and the temperature controller is configured to:

estimate the time required for temperature control for each of the plurality of target in-vehicle devices as an individual temperature control time;

identify a maximum time among a plurality of estimated individual temperature control times as a required temperature control time; and cause the temperature control device to start the temperature control at a timing obtained by back-calculating the necessary temperature control time from the start time of the special traveling.

3. The temperature control system according to claim 1, wherein the vehicle is an electricity-driven vehicle including a battery and a traveling motor driven by electric power supplied from the battery, and the temperature controller is configured to:

estimate an SOC required for the special traveling as a required SOC; and stop the temperature control when a current SOC of the battery is less than the required SOC.

4. The temperature control system according to claim 1, wherein the temperature controller is configured to correct a control of a vehicle interior air conditioning according to a comparison result between a current temperature and a target temperature of each of the plurality of target in-vehicle devices.

5. The temperature control system according to claim 1, wherein the vehicle is an electricity-driven vehicle including a battery and a traveling motor driven by electric power supplied from the battery, the plurality of target in-vehicle devices include the battery, the traveling motor, and a PCU, the temperature control device includes a radiator fan, a compressor, and a water pump, the special traveling is a course traveling in which the vehicle travels on a course of a circuit, the start time of the special traveling is a start time of the course traveling, the temperature controller is configured to estimate the start time of the course traveling based on an instruction from a user or information obtained by communication with an external communication device.

* * * * *